(12) United States Patent
Marupaduga et al.

(10) Patent No.: US 10,200,910 B1
(45) Date of Patent: Feb. 5, 2019

(54) WIRELESS COMMUNICATION SYSTEM TO DYNAMICALLY MODIFY A BUFFER STATUS REPORT (BSR) TIMER IN A WIRELESS RELAY

(71) Applicant: Sprint Communications Company L.P., Overland Park, KS (US)

(72) Inventors: Sreekar Marupaduga, Overland Park, KS (US); Vanil Parihar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 23 days.

(21) Appl. No.: 15/338,791

(22) Filed: Oct. 31, 2016

(51) Int. Cl.
*H04W 28/02* (2009.01)
*H04L 12/26* (2006.01)

(52) U.S. Cl.
CPC ......... *H04W 28/0278* (2013.01); *H04L 43/16* (2013.01); *H04W 28/0215* (2013.01)

(58) Field of Classification Search
CPC .......... H04W 28/0278; H04W 28/0215; H04L 43/16
See application file for complete search history.

(56) References Cited

U.S. PATENT DOCUMENTS

| | | | | |
|---|---|---|---|---|
| 9,160,662 | B2* | 10/2015 | Natarajan | H04B 7/155 |
| 9,763,151 | B2* | 9/2017 | Kim | H04W 36/04 |
| 9,867,074 | B2* | 1/2018 | Virtej | H04W 24/10 |
| 2010/0034147 | A1* | 2/2010 | Ho | H04L 1/18 370/328 |
| 2010/0093349 | A1* | 4/2010 | Gandhi | H04W 48/18 455/435.2 |
| 2011/0039568 | A1* | 2/2011 | Zhang | H04W 52/50 455/452.1 |
| 2011/0218010 | A1* | 9/2011 | Hoymann | H04B 7/024 455/513 |
| 2011/0261747 | A1* | 10/2011 | Wang | H04B 7/155 370/315 |
| 2011/0300858 | A1* | 12/2011 | Lee | H04W 8/24 455/425 |
| 2013/0083677 | A1* | 4/2013 | Kim | H04W 72/1284 370/252 |
| 2013/0235768 | A1* | 9/2013 | Earnshaw | H04L 1/1671 370/280 |
| 2014/0056198 | A1* | 2/2014 | Quan | H04W 52/0216 370/311 |
| 2014/0056243 | A1* | 2/2014 | Pelletier | H04W 74/04 370/329 |
| 2014/0126399 | A1* | 5/2014 | Damnjanovic | H04W 72/1252 370/252 |

(Continued)

FOREIGN PATENT DOCUMENTS

CN 104869526 8/2015

*Primary Examiner* — Jay P Patel

(57) ABSTRACT

A wireless communication system to dynamically modify a Buffer Status Report (BSR) timer in a wireless relay. The wireless communication system includes a wireless access point configured to determine a User Equipment (UE) load on the wireless access point. The wireless access point is further configured to compare the UE load to a relay reporting threshold, and if the UE load exceeds the relay reporting threshold, then the wireless access point configured to increase the BSR timer for the wireless relay. The wireless access point configured to transfer a new BSR timer to the wireless relay.

18 Claims, 7 Drawing Sheets

(56) References Cited

U.S. PATENT DOCUMENTS

| | | | |
|---|---|---|---|
| 2015/0117342 A1* | 4/2015 | Loehr | H04W 72/1284 370/329 |
| 2015/0131461 A1* | 5/2015 | Ramkumar | H04W 52/0251 370/252 |
| 2015/0327115 A1* | 11/2015 | Park | H04W 28/06 370/328 |
| 2016/0081109 A1* | 3/2016 | Li | H04W 28/0278 370/329 |
| 2016/0112910 A1* | 4/2016 | Agiwal | H04W 76/14 370/331 |
| 2016/0219475 A1* | 7/2016 | Kim | H04W 76/025 |
| 2016/0227574 A1* | 8/2016 | Raina | H04W 72/14 |
| 2016/0234714 A1* | 8/2016 | Basu Mallick | H04W 28/085 |
| 2016/0309503 A1* | 10/2016 | Quan | H04W 72/1268 |
| 2017/0019918 A1* | 1/2017 | Voigt | H04W 72/14 |
| 2017/0027018 A1* | 1/2017 | Langereis | H04W 72/042 |
| 2017/0055294 A1* | 2/2017 | Lee | H04W 72/1284 |
| 2017/0164419 A1* | 6/2017 | Kim | H04W 76/028 |
| 2017/0212865 A1* | 7/2017 | Yang | G06F 15/167 |
| 2017/0245245 A1* | 8/2017 | Kim | H04W 72/1284 |
| 2017/0295590 A1* | 10/2017 | Loehr | H04W 72/1242 |
| 2017/0359116 A1* | 12/2017 | Hwang | H04B 17/309 |
| 2017/0359782 A1* | 12/2017 | Swaminathan | H04W 52/0245 |
| 2018/0020500 A1* | 1/2018 | Pelletier | H04W 76/046 |
| 2018/0041912 A1* | 2/2018 | Futaki | H04W 64/006 |

\* cited by examiner

WIRELESS COMMUNICATION SYSTEM TO DYNAMICALLY MODIFY A BUFFER STATUS REPORT (BSR) TIMER IN A WIRELESS RELAY

TECHNICAL BACKGROUND

User Equipment (UEs), such as mobile phones are used for services such as voice and video calling, Internet access and web browsing, media streaming, data messaging, E-mail, and the like. To receive these services, wireless communication devices connect to a wireless communication network through a wireless access point, such as a base station or Long Term Evolution (LTE) evolved Node B (eNodeB). The wireless access points perform wireless networking tasks like device handovers, radio interference management, and multipoint coordination.

To extend the coverage of a wireless communication network, wireless relays are used between the wireless access points and the UEs. A wireless relay exchanges wireless signals that transport user data with UEs. The wireless relay also exchanges corresponding wireless signals that transport the user data with the wireless access points.

A UE periodically reports its status, such as signal strength and location to the wireless access point or wireless relay that the UE is communicating with. When a UE has data to transmit in the uplink (UL) connection (i.e. to the wireless access point or wireless relay), the UE notifies the wireless access point using a Buffer Status Report (BSR). The BSR notifies the wireless access point or the wireless relay of the UL resources required to transmit the data in the UL buffer, so that the wireless access point or wireless relay can schedule the UL resources needed to transmit the data.

OVERVIEW

Examples disclosed herein provide a system, method, hardware, and software to dynamically modify a Buffer Status Report (BSR) timer in a wireless relay. The method comprises a wireless access point determining a User Equipment (UE) load on the wireless access point. The method further comprises the wireless access point comparing the UE load to a relay reporting threshold, and if the UE load exceeds the relay reporting threshold, then increasing the BSR timer for the wireless relay and transferring a new BSR timer to the wireless relay.

In another example, a wireless communication system dynamically modifies a Buffer Status Report (BSR) timer in a wireless relay. The wireless access point determines a UE load on the wireless access point. The wireless access point further compares the UE load to a relay reporting threshold, and if the UE load exceeds the relay reporting threshold, then the wireless access point increases the BSR timer for the wireless relay and transfers a new BSR timer to the wireless relay.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
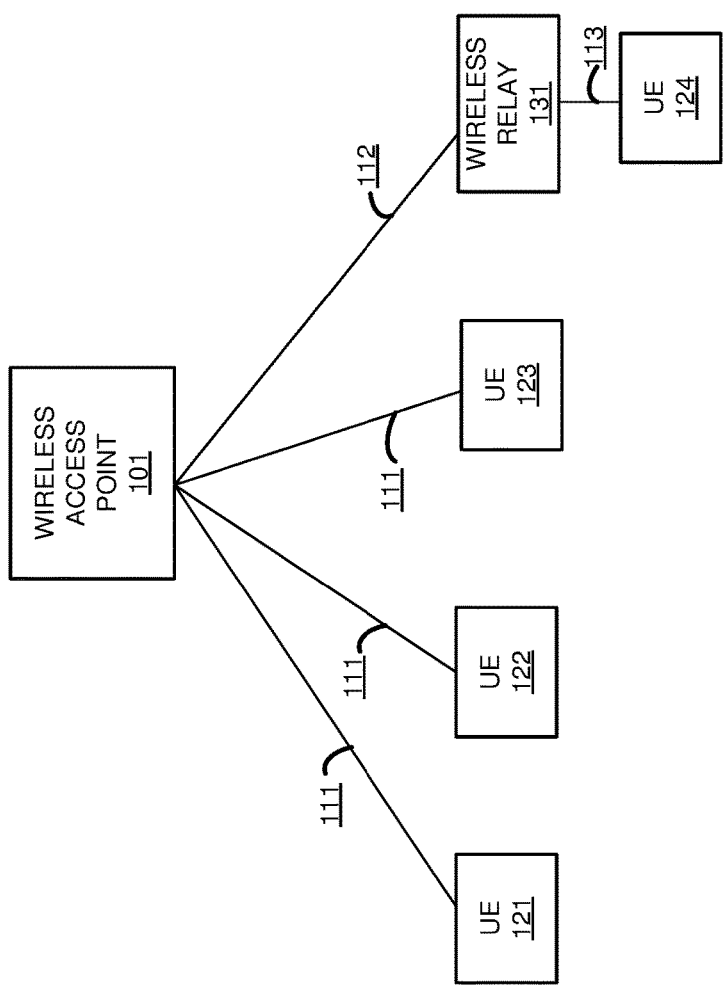
FIG. 1 illustrates a wireless communication system to dynamically modify a Buffer Status Report (BSR) timer in a wireless relay.

FIG. 1 illustrates wireless communication system 100 to dynamically modify a Buffer Status Report (BSR) timer in wireless relay 131. Wireless communication system 100 includes wireless access point 101, User Equipment (UEs) 121-124, and wireless relay 131. Wireless access point 101 and UEs 121-123 communicate over wireless link 111. Wireless access point 101 and wireless relay 131 communicate over communication link 112. Wireless relay 131 and UE 124 communicate over wireless link 113.

Communication links 111-113 may use any of a variety of communication media, such as air, metal, optical fiber, or any other signal propagation path, including combinations thereof. Also, the links may use any of a variety of communication protocols, such as Internet, telephony, optical networking, wireless communication, wireless fidelity (Wi-Fi), Long Term Evolution (LTE), code division multiple access (CDMA), worldwide interoperability for microwave access (Wi-MAX), or any other communication protocols and formats, including combinations thereof. Further, the links could be direct links or they might include various intermediate components, systems, and networks.

In operation, wireless access point 101 determines a UE load on wireless access point 101. In some examples the UE load includes wireless relay 131, and in other examples, the UE load does not include wireless relay 131. Although not required, the UE load may comprise the number of connected UEs. Wireless access point 101 may determine the number of connected UEs based on Radio Resource Control (RRC) connection messages. In other examples, the UE load may comprise the total bandwidth or amount of user data being transmitted and/or received.

Wireless access point 101 compares the UE load to a relay reporting threshold, and if the UE load exceeds the relay reporting threshold, then wireless access point 101 increases the BSR timer for wireless relay 131 and transfers a new BSR timer to wireless relay 131. In some examples, the BSR timer comprises a periodic BSR timer.

In some examples, wireless access point 101 may comprise an LTE eNodeB. Examples of UEs 121-124 include wireless communication devices such as a telephone, cellular phone, mobile phone, smartphone, Personal Digital Assistant (PDA), laptop, computer, e-book, eReader, mobile Internet appliance, or some other wireless communication device with a wireless transceiver—including combinations thereof.

Figure 2:
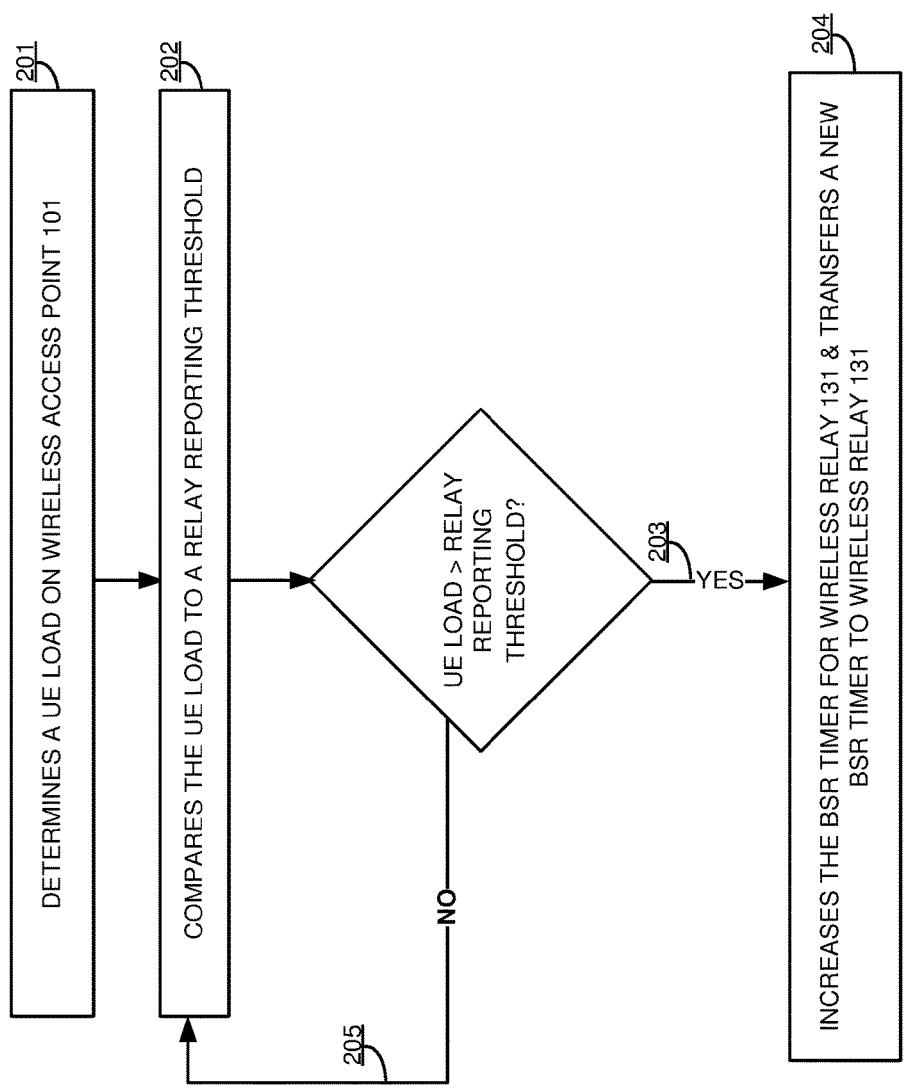
FIG. 2 illustrates the operation of the wireless communication system to dynamically modify a BSR timer in a wireless relay.

FIG. 2 illustrates the operation of wireless communication system 100 to dynamically modify a BSR timer in wireless relay 131. Wireless access point 101 determines a UE load on wireless access point 101 (201). In some examples, wireless access point 101 determines the number of connected UEs/wireless access relays based on RRC connection messages. In another example, wireless access point 101 may determine the bandwidth usage over a given connection or total bandwidth.

Wireless access point 101 compares the UE load to a relay reporting threshold (202), and if the UE load exceeds the relay reporting threshold (203), then wireless access point 101 increases the BSR timer for wireless relay 131 and transfers a new BSR timer to wireless relay 131 (204). For example, wireless access point 101 may increase the time between the transmission of the BSRs for wireless relay 131, but makes no change to the BSR timer for regular UEs. If the UE load does not exceed the relay reporting threshold (205), then wireless access point 101 continues to monitor the UE load compared to the relay reporting threshold. In some cases, wireless access point 101 may decrease the BSR timer in wireless relay 131 after it was previously increased.

Figure 3:
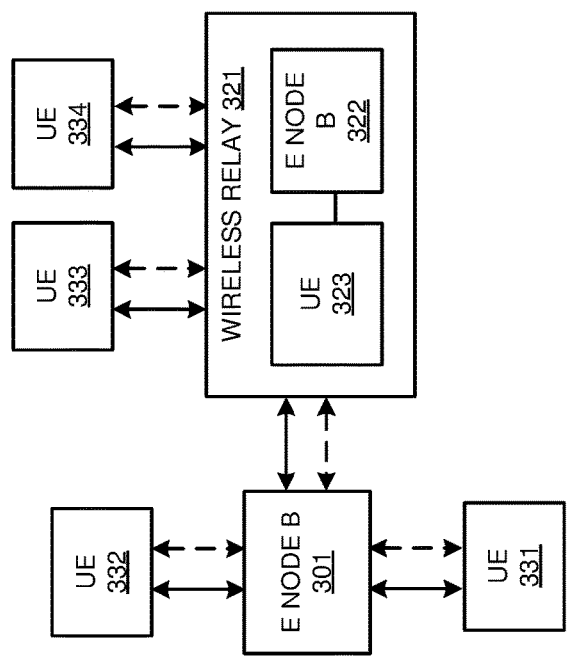
FIG. 3 illustrates a Long Term Evolution (LTE) communication system to dynamically modify a BSR timer in a wireless relay.

FIG. 3 illustrates LTE communication system 300 to dynamically modify a BSR timer in a wireless relay. LTE communication system 300 includes eNodeB 301, User Equipment (UEs) 331-334, and wireless relay 321. Wireless relay 321 includes eNodeB 322 and UE 323. ENodeB 301 communicates with UEs 331-332 and UE 323. UEs 333-334 communicate with eNodeB 322, and eNodeB 322 communicates with UE 323.

In operation, eNodeB 301 determines a UE load on eNodeB 301. eNodeB 301 compares the UE load to a relay reporting threshold, and if the UE load exceeds the relay reporting threshold, then eNodeB 301 increases the BSR timer for wireless relay 321 and transfers a new BSR timer to wireless relay 321. In some examples, the BSR timer for wireless relay 321 may be more aggressive than the BSR timer for UEs 331-332 (i.e. determined more frequently or lower thresholds, increased at a higher rate). In other examples, the BSR timer for wireless relay 321 may be increased (i.e. a longer period between BSRs). In addition, wireless relay 321 may be weighted differently when determining UE count. User data is communicated over the data signaling links, represented with solid lines. Control signaling, such as BSR timer information is transmitted over the control signaling links, represented with dashed lines.

Figure 4:
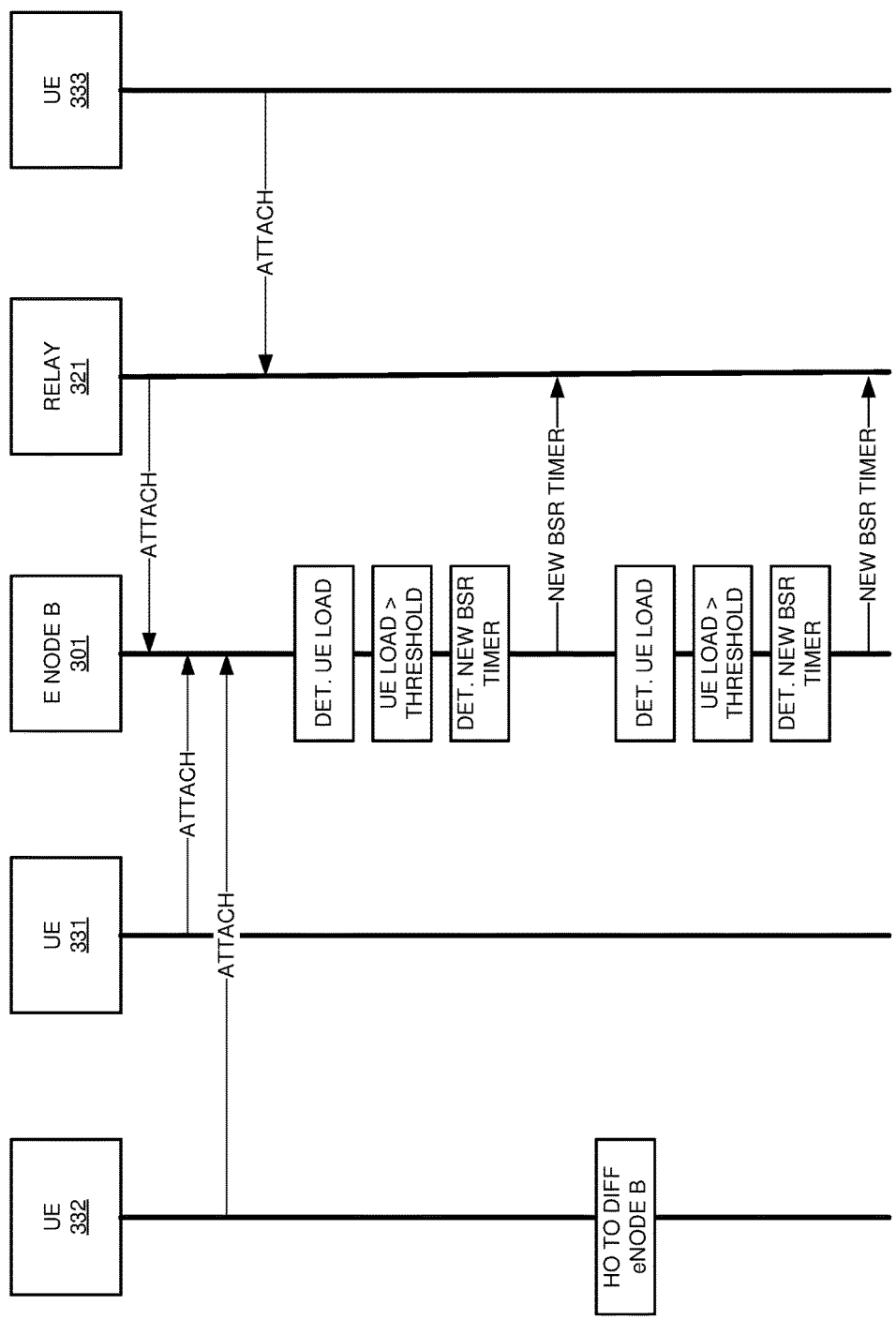
FIG. 4 illustrates the operation of the LTE communication system to dynamically modify a BSR timer in a wireless relay a communication control system.

FIG. 4 illustrates the operation of LTE communication system 300 to dynamically modify a BSR timer in a wireless relay. Wireless relay 321 attaches to/registers with eNodeB 301. This operation may happen when wireless relay 301 is added to LTE communication network 300. UE 333 attaches to/registers with wireless relay 321. UEs 331-332 attach to/register with eNodeB 301. In some examples, UEs 331-332 may register with eNodeB 301 upon entering the cell sector served by eNodeB 301. In other examples, UE 331 may be handed off from another eNodeB to eNodeB 301 and UE 332 may register with eNodeB 301 upon powering up.

ENodeB 301 determines a UE load on eNodeB 301. If the UE load comprises the number of attached UEs, the UE load would be three UEs: wireless relay 321, UE 331, and UE 332. Although UE 333 is attached to eNodeB 301 via wireless relay 321, it is not included in the UE load as it is not separately identified via its own RRC connection message.

ENodeB 301 compares the UE load to a relay reporting threshold. In this example, the UE threshold is two, and therefore, the UE load exceeds the relay reporting threshold; and eNodeB 301 increases the BSR timer for wireless relay 321 and transfers a new BSR timer to wireless relay 321. In some examples, UE 333 may be included in the UE count. Although not required. E Node B 301 may also determine the number of connected UEs (i.e. UEs 331–332=2), compare the number of UEs to a UE reporting threshold, and modify the BSR timer for the UEs if the number of UEs exceeds a UE reporting threshold.

UE 332 handoffs to another eNodeB in LTE communication system 300. ENodeB 301 determines a UE load on eNodeB 301. The UE load now equals two, which is not greater than the relay reporting threshold. ENodeB 301 determines a new BSR timer for wireless relay 321. In some examples, eNodeB 301 resets the BSR timer in wireless relay 321 to the previous BSR timer.

Figure 5:
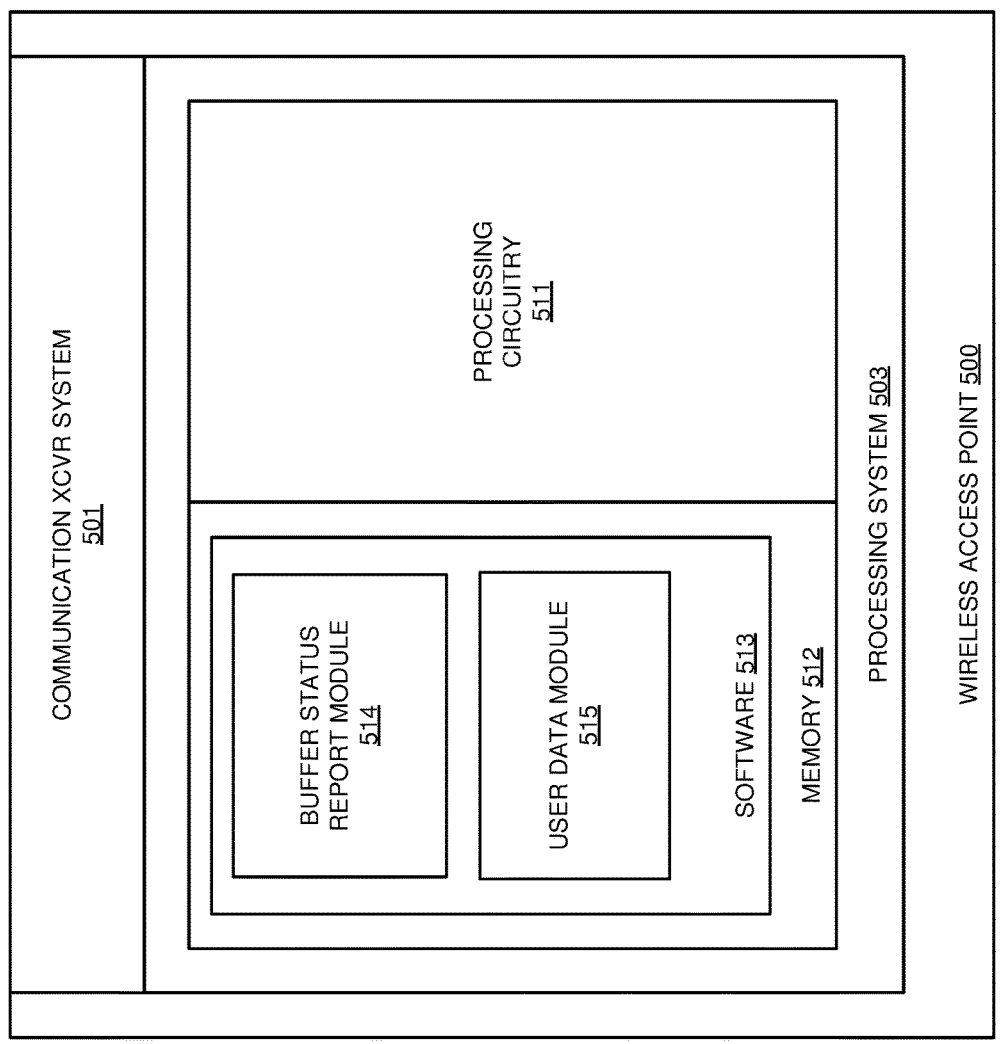
FIG. 5 illustrates an example of a wireless access point.

FIG. 5 illustrates wireless access point 500 to dynamically modify a BSR timer in a wireless relay. Wireless access point 500 is an example of wireless access point 101 and eNodeB 301. Although these systems may use alternative configurations and operations. Wireless access point 500 comprises communication transceiver system 501 and processing system 503. Processing system 503 includes processing circuitry 511 and memory 512 that stores software 513. Software 513 comprises software modules 514-515.

Communication transceiver systems 501 comprise components that communicate over communication links such as network cards, ports, RF transceivers, processing circuitry and software, or some other communication components. Communication transceiver systems 501 may be configured to communicate over metallic, wireless, or optical links. Communication transceiver systems 502 may be configured to use TDM, IP, Ethernet, optical networking, wireless protocols, communication signaling, or some other communication format—including combinations thereof. Communication transceiver system 502 may receive and transfer registration requests, user data, and BSR timer data.

Processing circuitry 511 comprises microprocessor and other circuitry that retrieves and executes operating software 513 from memory 512. Processing circuitry 511 may comprise a single device or could be distributed across multiple devices—including devices in different geographic areas. Processing circuitry 511 may be embedded in various types of equipment. Examples of processing circuitry 511 include central processing units, application specific processors, logic devices, and/or any type of computer processing devices—including combinations thereof.

Memory 512 comprises a non-transitory computer readable storage medium readable by processing system 503 and capable of storing software 513, such as a disk drive, flash drive, data storage circuitry, or some other hardware memory apparatus—including combinations thereof.

Memory 512 can include volatile and/or non-volatile, removable and non-removable media implemented in any method or technology for storage of information, such as computer readable instructions, data structures, program modules, or other data—including combinations thereof. Memory 512 may comprise a single device or could be distributed across multiple devices—including devices in different geographic areas. Memory 512 may be embedded in various types of equipment. In some examples, a computer apparatus could comprise memory 512 and software 513.

Software 513 comprises computer programs, firmware, or some other form of machine-readable processing instructions. Software 513 may include an operating system, utilities, drivers, network interfaces, applications, or some other type of software. In this example, software 513 comprises buffer status report module 514 and user data module 515. Although software 513 could have alternative configurations in other examples. Software 513 may be implemented in program instructions and may be executed by processing system 503. Software 513 may include additional processes, programs, or components, such as operating system software, database software, or application software—including combinations thereof. Software 513 may also comprise firmware or some other form of machine-readable processing instructions executable by processing system 503.

When executed, software 513 directs processing system 503 to operate as described herein to dynamically modify a BSR timer in a wireless relay. In particular, buffer status report module 514 directs processing system 503 to determine the UE load and determine and transfer a BSR timer based on the UE load. User data module 515 directs processing system 503 to receive and transfer user data to UEs. User data module 515 may also direct processing system 503 to determine the UE load.

Figure 6:
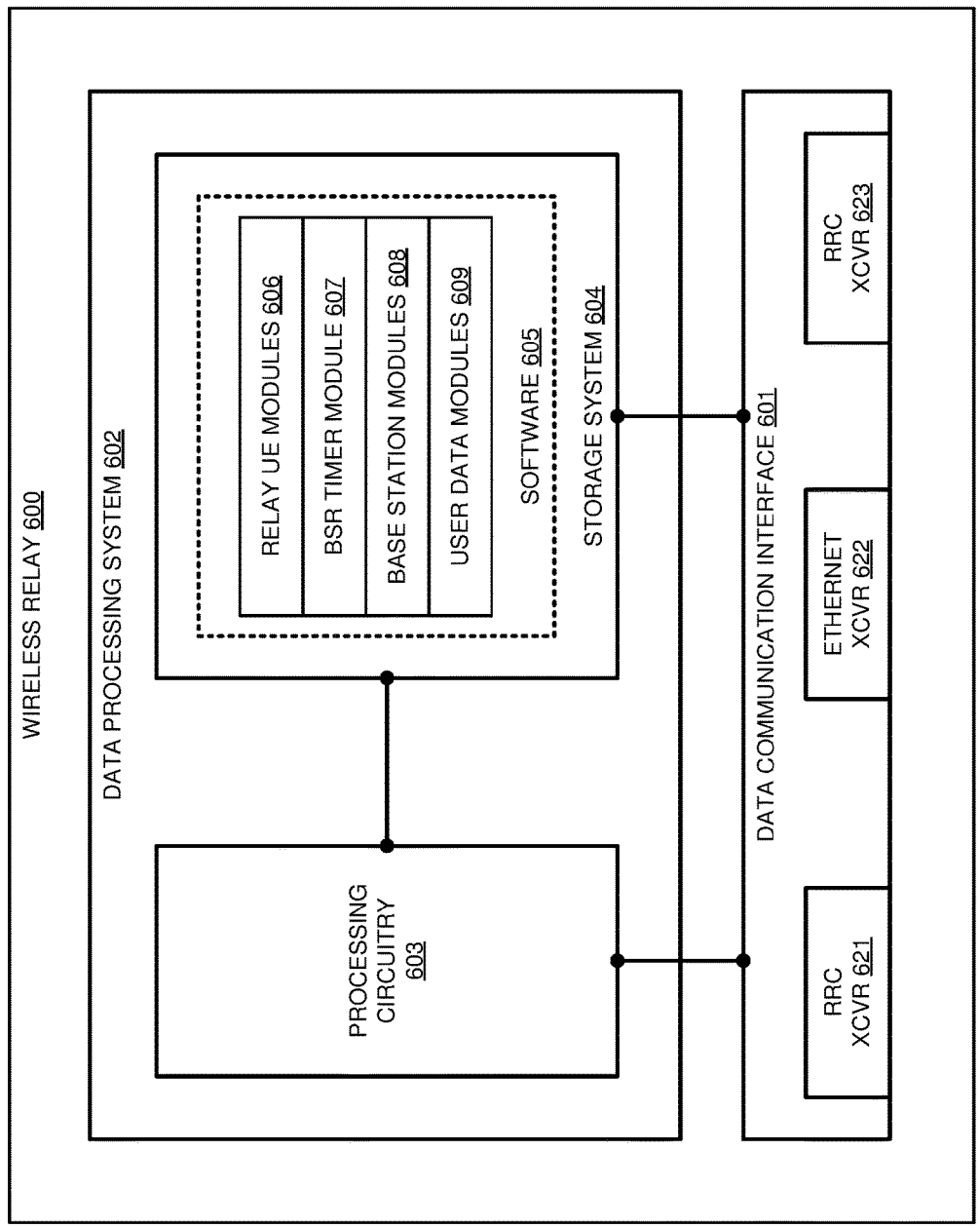
FIG. 6 illustrates an example of a wireless relay.

FIG. 6 illustrates wireless relay 600 to dynamically modify a BSR timer in a wireless relay. Wireless relay 600 is an example of wireless relays 131 and 321, although relays 131 and 321 may use alternative configurations and operations. Wireless relay 600 comprises data communication interface 601 and data processing system 602. Data communication interface 601 comprises RRC transceiver 621, Ethernet transceiver 622, and RRC transceiver 623. Data processing system 602 comprises processing circuitry 603 and storage system 604. Storage system 604 stores software 605. Software 605 includes respective software modules 606-609.

Transceivers 621-623 comprise communication components, such as antennas, amplifiers, filters, modulators, ports, bus interfaces, digital signal processors, memory, software, and the like. Processing circuitry 603 comprises circuit boards, bus interfaces, integrated micro-processing circuitry, and associated electronics. Storage system 604 comprises non-transitory, machine-readable, data storage media, such as flash drives, disc drives, memory circuitry, data servers, and the like. Software 605 comprises machine-readable instructions that control the operation of processing circuitry 603 when executed. Wireless relay 600 may be centralized or distributed. All or portions of software 606-609 may be externally stored on one or more storage media, such as circuitry, discs, and the like. Some conventional aspects of wireless relay 600 are omitted for clarity, such as power supplies, enclosures, and the like.

When executed by processing circuitry 603, software modules 606-609 direct circuitry 603 to perform the following operations. Relay UE modules 606 direct RRC transceiver 623 to interact with donor eNodeBs. Relay UE modules 606 scan for donor eNodeBs. BSR timer module 607 directs processing system 602 to transmit the BSR to the donor eNodeB according to the BSR timer. Base station modules 608 direct RRC transceiver 621 to interact with UEs. User data modules 609 exchange user data between transceivers 621-623.

Figure 7:
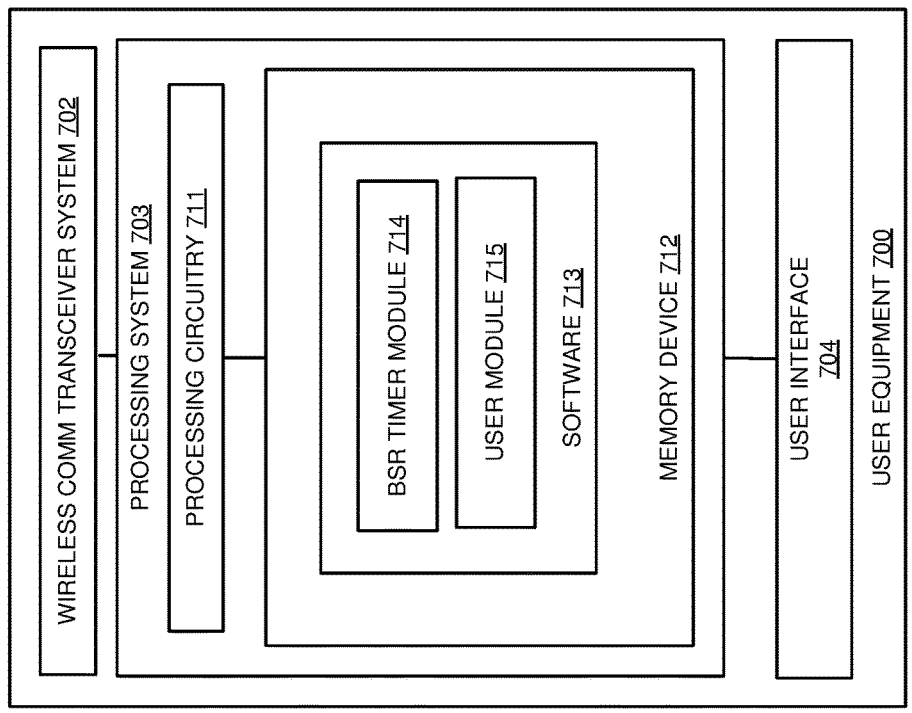
FIG. 7 illustrates an example of a User Equipment (UE).

FIG. 7 illustrates User Equipment (UE) 700. UE 700 is an example of UEs 121-124 and UEs 331-334, although UEs 121-124 and UEs 331-334 could use alternative configurations. UE 700 comprises wireless communication transceiver system 702, processing system 703, and user interface 704. Processing system 703 is linked to wireless communication transceiver system 702 and user interface 704. Processing system 703 includes processing circuitry 711 and memory device 712 that stores operating software 713. UE 700 may include other well-known components such as a battery and enclosure that are not shown for clarity. UE 700 may be a telephone, cellular phone, mobile phone, smartphone, personal digital assistant (PDA), computer, laptop, tablet, e-book, mobile Internet appliance, media player, game console, wireless network interface card, or some other wireless communication apparatus—including combinations thereof.

Wireless communication transceiver system 702 comprises Radio Frequency (RF) communication circuitry and an antenna. The RF communication circuitry typically includes an amplifier, filter, RF modulator, and signal processing circuitry. Wireless communication transceiver system 702 may also include a memory device, software, processing circuitry, or some other communication device. Wireless communication transceiver system 702 may use various communication formats, such as LTE, CDMA, EVDO, WIMAX, GSM, WIFI, HSPA, or some other wireless communication format—including combinations thereof.

User interface 704 comprises components that interact with a user to receive user inputs and to present media and/or information. User interface 704 may include a speaker, microphone, buttons, lights, display screen, touch screen, touch pad, scroll wheel, communication port, or some other user input/output apparatus—including combinations thereof. User interface 704 may be omitted in some examples.

Processing circuitry 711 comprises microprocessor and other circuitry that retrieves and executes operating software 713 from memory device 712. Memory device 712 comprises a non-transitory storage medium, such as a disk drive, flash drive, data storage circuitry, or some other memory apparatus. Processing circuitry 711 is typically mounted on a circuit board that may also hold memory device 712, portions of wireless communication transceiver system 702, and user interface 704. Software 713 comprises computer programs, firmware, or some other form of machine-readable processing instructions. Software 713 may include an operating system, utilities, drivers, network interfaces, applications, or some other type of software. When executed by processing circuitry 711, software 713 directs processing system 703 to operate user equipment 700 as described herein.

When executed, software 713 directs processing system 703 to operate as described herein to dynamically modify a BSR timer in a wireless relay. In particular, BSR timer module 714 directs processing system 703 to transmit the BSR according to the BSR timer. User data module 715 directs processing system 703 to send and receive user data.

Referring back to FIG. 1, UEs 121-124 comprise Radio Frequency (RF) communication circuitry and an antenna.

The RF communication circuitry typically includes an amplifier, filter, modulator, and signal processing circuitry. UEs 121-124 may also include a user interface, memory device, software, processing circuitry, or some other communication components. UEs 121-124 may be a telephone, computer, e-book, mobile Internet appliance, wireless network interface card, media player, game console, or some other wireless communication apparatus—including combinations thereof.

Wireless access point 101 comprises RF communication circuitry and an antenna. The RF communication circuitry typically includes an amplifier, filter, RF modulator, and signal processing circuitry. Wireless access point 101 may also comprise a router, server, memory device, software, processing circuitry, cabling, power supply, network communication interface, structural support, or some other communication apparatus. Wireless access point 101 could be a base station, Internet access node, telephony service node, wireless data access point, or some other wireless communication system—including combinations thereof.

Communication links 111-113 could use metal, glass, air, space, or some other material as the transport media. Communication links 111-113 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), Time Division Multiplex (TDM), Internet Protocol (IP), Ethernet, communication signaling, or some other communication format—including combinations thereof. Communication links 111-113 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system to dynamically modify a Buffer Status Report (BSR) timer in a wireless relay, the method comprising:
   a wireless access point determining a User Equipment (UE) load on the wireless access point, wherein the UE load includes at least a number of UEs;
   the wireless access point comparing the UE load to a relay reporting threshold, and if the UE load exceeds the relay reporting threshold, then increasing the BSR timer for the wireless relay to decrease BSR transfers from the wireless relay; and
   the wireless access point indicating the increased BSR timer to the wireless relay.

2. The method of claim 1 further comprising the wireless access point comparing the UE load to a UE reporting threshold, and if the UE load exceeds the UE reporting threshold, then increasing another BSR timer for at least one of the UEs to decrease BSR transfers from the at least one of the UEs.

3. The method of claim 2 wherein the relay reporting threshold is more aggressive than the UE reporting threshold.

4. The method of claim 1 wherein the UE load further includes the wireless relay.

5. The method of claim 1 wherein the UE load does not include the wireless relay.

6. The method of claim 1 wherein the UE load further includes a total bandwidth.

7. The method of claim 1 wherein the UE load further includes UEs connected to the wireless relay.

8. The method of claim 1 wherein the wireless communication system comprises a Long Term Evolution (LTE) communication network.

9. The method of claim 1 wherein the wireless access point comprises a Long Term Evolution (LTE) evolved Node B (eNodeB).

10. A wireless communication system to dynamically modify a Buffer Status Report (BSR) timer in a wireless relay, the wireless communication system comprising:
    a wireless access point configured to determine a User Equipment (UE) load on the wireless access point, wherein the UE load includes at least a number of UEs;
    the wireless access point configured to compare the UE load to a relay reporting threshold, and if the UE load exceeds the relay reporting threshold, then increase the BSR timer for the wireless relay to decrease BSR transfers from the wireless relay; and
    the wireless access point configured to indicate the increased BSR timer to the wireless relay.

11. The wireless communication system of claim 10 wherein the wireless access point is configured to compare the UE load to a UE reporting threshold, and if the UE load exceeds the UE reporting threshold, then the wireless access point configured to increase another BSR timer for at least one of the UEs to decrease BSR transfers from the at least one of the UEs.

12. The wireless communication system of claim 11 wherein the relay reporting threshold is more aggressive than the UE reporting threshold.

13. The wireless communication system of claim 10 wherein the UE load further includes the wireless relay.

14. The wireless communication system of claim 10 wherein the UE load does not include the wireless relay.

15. The wireless communication system of claim 10 wherein the UE load further includes a total bandwidth.

16. The wireless communication system of claim 10 wherein the UE load further includes UEs connected to the wireless relay.

17. The wireless communication system of claim 10 wherein the wireless communication system comprises a Long Term Evolution (LTE) communication network.

18. The wireless communication system of claim 10 wherein the wireless access point comprises a Long Term Evolution (LTE) evolved Node B (eNodeB).

* * * * *